United States Patent [19]
Rambo

[11] Patent Number: 4,566,133
[45] Date of Patent: Jan. 21, 1986

[54] SWITCHED DIVERSITY METHOD AND APPARATUS FOR FM RECEIVERS

[75] Inventor: William R. Rambo, Stanford, Calif.

[73] Assignee: Commtech International, Menlo Park, Calif.

[21] Appl. No.: 579,786

[22] Filed: Feb. 13, 1984

Related U.S. Application Data

[63] Continuation-in-part of Ser. No. 453,470, Dec. 27, 1982, Pat. No. 4,499,606.

[51] Int. Cl.$^4$ ............................................. H04B 7/08
[52] U.S. Cl. .................................... 455/277; 455/65; 455/278
[58] Field of Search ................. 455/52, 65, 133–135, 455/277, 278, 297; 375/100

[56] References Cited

U.S. PATENT DOCUMENTS

| | | |
|---|---|---|
| 2,520,984 | 9/1950 | Williams . |
| 2,729,741 | 1/1956 | Chapman . |
| 2,872,568 | 2/1959 | Provaz ........................ 455/277 |
| 2,937,268 | 5/1960 | Downie . |
| 3,329,901 | 7/1967 | Case ............................ 455/277 |
| 3,368,151 | 2/1968 | Verwey et al. . |
| 3,475,686 | 10/1969 | Holt . |
| 3,537,011 | 10/1970 | Escoula . |
| 3,670,275 | 6/1972 | Kalliomaki et al. . |
| 4,091,386 | 5/1978 | Luedtke et al. ............. 343/713 |
| 4,143,369 | 3/1979 | Ayers et al. ............... 343/6.5 R |
| 4,170,759 | 10/1979 | Stimple et al. .............. 455/277 |
| 4,255,816 | 3/1981 | Grunza et al. ............... 455/277 |

FOREIGN PATENT DOCUMENTS

| | | | |
|---|---|---|---|
| 2827572 | 12/1979 | Fed. Rep. of Germany ...... 455/277 |
| 0168440 | 12/1981 | Japan . |
| 0010542 | 1/1982 | Japan ............................... 455/277 |
| 0014224 | 1/1982 | Japan . |

OTHER PUBLICATIONS

"FM Multipath Distortion in Automobile Receivers Has Been Significantly Reduced by a New Antenna System"—Takeda et al, IEEE Trans. on Consumer Electronics, vol. CE-26, Aug. 1980, pp. 263–269.
"FM Receivers in Automobiles: A Case for Diversity Reception"—Finger et al, IEEE Trans. on Consumer Electronics, vol. CE-27, pp. 51–61, Feb. 1981.
"Diversity Techniques for Mobile Radio Reception"—Parsons et al, IEEE Trans. on Vehicular Technology, vol. VT-25, No. 3, pp. 75–85, Aug. 1976.

Primary Examiner—Marc E. Bookbinder
Attorney, Agent, or Firm—Victor R. Beckman

[57] ABSTRACT

An FM diversity receiver system and method are disclosed which include two antennas and a switch for switching the receiver from one antenna to the other. A fade control signal is produced which is related to the received FM signal, in which fade control signal both multipath and non-multipath disturbances are manifested. Disturbances in the fade control signal are compared with a threshold voltage and, when the disturbance exceeds the threshold voltage, antenna switching is momentarily prevented to prevent antenna switching in response to electrical noise impulses, such as ignition noise, which are shorter than the period during which antenna switching is momentarily prevented. If the fade control signal disturbance continues to exceed the threshold voltage after the momentary period of disablement, the threshold voltage is reset to a level related to the maximum level of the fade control signal disturbance, after which antenna switching takes place. Antenna switching then is again momentarily prevented; this time to prevent antenna switching in response to switching transients produced during the antenna switching operation.

37 Claims, 14 Drawing Figures

SWITCHED DIVERSITY METHOD AND APPARATUS FOR FM RECEIVERS

DESCRIPTION

Related Applications

This is a continuation-in-part of U.S. patent application Ser. No. 453,470 filed Dec. 27, 1982 by the present inventor William R. Rambo entitled Reception Enhancement in Mobile FM Broadcast Receivers and the Like now U.S. Pat. No. 4,499,606.

TECHNICAL FIELD

This invention relates to diversity receivers of frequency modulated (FM) signals and more particularly to FM broadcast receivers of the switched diversity type.

BACKGROUND ART

Prior art switched diversity receivers are well known as shown, for example, in U.S. Pat. No. 2,729,741, U.S. Pat. No. 2,872,568 and in the following articles; Takeda et al, "FM Multipath Distortion in Automobile Receivers Has Been Significantly Reduced by a New Antenna System", *IEEE Transactions on Consumer Electronics,* pp 263-269 Vol. CE-26, August 1980; Finger et al, "FM Receivers in Automobiles: A Case For Diversity Reception" *IEEE Trans. on Consumer Electronics,* Vol. CE-27, pp. 51-61, February 1981; and Parsons et al, "Diversity Techniques for Mobile Radio Reception" *IEEE Trans. on Vehicular Technology,* Vol. VT-25 No. 3, pp. 75-85 August, 1976. These diversity receiving systems employ two antennas which are spaced apart and/or which have different polarizations. One of the two antennas is connected to the FM receiver by means of a relay switch, which switch is controlled by a circuit which is responsive to a measure of the detected, or demodulated, receiver signal. Many prior art control circuits are insensitive to rapid changes in the received signal and, therefore, often fail to connect the antenna having the best signal to the receiver.

SUMMARY OF THE INVENTION AND OBJECTS

An object of this invention is the provision of an improved switched diversity FM receiver which provides for greatly improved reception under recurrent fade conditions.

An object of this invention is the provision of an improved switched diversity FM receiver in which antenna selection is based upon the disturbance level (noise and distortion) in the received signals, and not alone upon aggregate signal strength.

An object of this invention is the provision of an improved switched diversity FM receiver of the above-mentioned type which includes decision and switch control means responsive to frequency-selective signal fading for the primary control of switching to greatly speed the decision process and to minimize audible transients often associated with switched diversity systems.

An object of this invention is the provision of an improved decision and switch control means of the aboved-mentioned type which includes means for preventing pulse input "fade" signals to the receiver, such as apparent fade signals produced by ignition noise and antenna switching transients, from producing an antenna switching operation.

The above and other objects of this invention are achieved by use of a decision and control circuit which is responsive to a first control signal which is related to a peak signal level in the FM receiver before signal limiting and frequency discrimination. The full range of amplitude fluctuations including those produced by frequency-selective fading, ignition noise, lightning, antenna switching transients, and the like, are reflected in the first control signal. This first control signal is conveniently obtained from the IF level meter driver circuit often included in the IF system of FM receivers. A second control signal for the decision and control circuit may be provided, which control signal is related to the strength of the received signal after IF limiting. This second control signal may be obtained from the mute control signal driver often included in FM receivers. The use of the first control signal, having a level corresponding to a wide frequency range of amplitude fluctuations is essential to operation of the decision and control circuit of the present invention in order that the decision and control circuit may respond to the onset of a disturbance for switching antennas before the disturbance is noticeable in the audio output from the receiver. If both control signals are employed, they are combined to provide a unitary fade control signal. The development of the control signal is conveniently accomplished in the pre-detection section of the receiver where the desired program material is nominally in an FM format, while the noise and distortion components resulting from the multipath phenomena appear as AM manifestations.

A reference threshold voltage is established at the decision and control circuit for comparison with the fade control signal. Whenever the fade control signal level falls below the threshold voltage, an antenna switching operation takes place a short time theraftrer, provided that the fade control signal remains below the threshold voltage after a predetermined time period, on the order of 12 microseconds. The decision and control circuit is momentarily disabled for a period of approximately 12 microseconds (which time period is selected to be slightly longer than the predetection impulse response period of the receiver) whenever the fade control signal initially falls below the threshold voltage to provide for the above-described operation. If, after the momentary disablement period, the fade control signal no longer is at a level below the threshold voltage, no antenna switching operation takes place. With this arrangement, electrical noise impulse signals, such as ignition noise, which may appear as a fade signal of sufficient magnitude to result in a fade control signal which momentarily falls below the threshold voltage level are prevented from effecting an antenna switching operation since the fade control signal which results from such electrical noise impulses is of shorter duration than the period of momentary disablement of the decision and control circuit. However, disturbing multipath fade events which result in control signal perturbations of longer duration do result in an antenna switching operation. With the present arrangement which includes filtering, or gating, in the time domain for short time periods when the fade control signal reaches the threshold voltage, fast response to fading of signal components throughout the complete range of the frequency spectrum of the FM signal is possible. Without time-domain filtering, frequency-domain filtering of high frequency components from the fade control signal is necessary to prevent antenna switching operation in response to electrical noise impulse signals, in which case valuable information concerning the quality of the received signal is lost to the decision and control circuit.

When antenna switching is effected by operation of the decision and control circuit, the decision and control circuit again is momentarily disabled for a short time period, on the order of 12 microseconds to prevent response thereof to any antenna switching transient which appears as a momentary fade of sufficient severity to result in a fade control signal which falls below the threshold voltage. Such switching transients result in sufficiently short fade control signals that after the period of momentary disablement, the fade control signal returns to a level above the threshold voltage in the absence of some other fade signal.

Additionally, means are provided for resetting the threshold level to the level of the fade control signal after the first momentary period of disablement, prior to antenna switching. Therefore, as soon as antenna switching is effected, the new fade control signal is compared to the new threshold level. With this arrangement, switching back to the first antenna is avoided if disturbances are present on both antennas, but the disturbance at the first antenna is greater than that at the second antenna.

BRIEF DESCRIPTION OF THE DRAWINGS

The invention, together with other objects and advantages thereof will be better understood from the following description considered with the accompanying drawings. It will be understood, however, that the illustrated embodiment of the invention included herein is for purposes of example only and that the invention is not limited thereto. In the drawings, wherein like reference characters refer to the same parts in the several views.

DESCRIPTION OF PREFERRED EMBODIMENT

Figure 1:
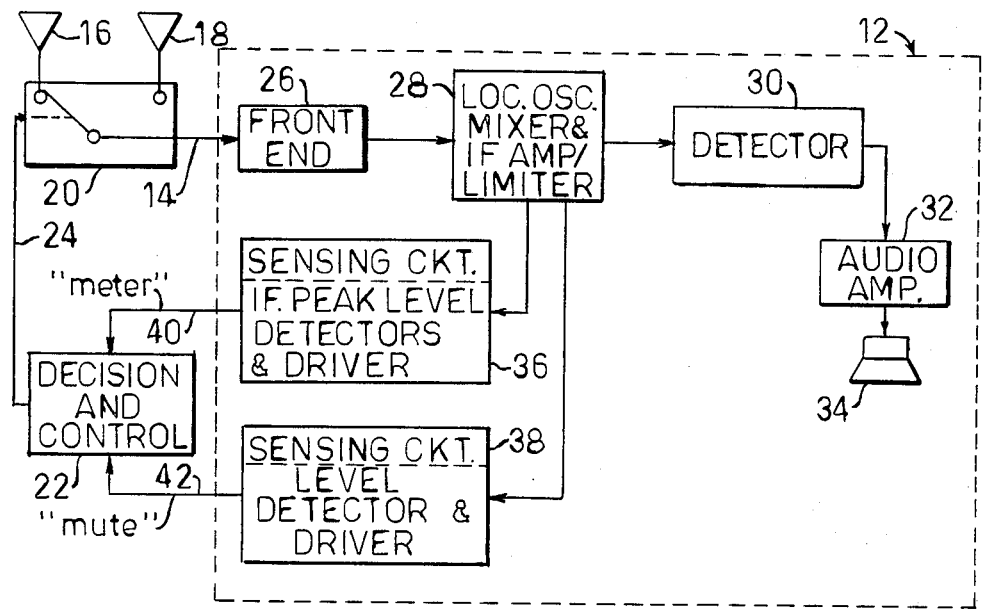
FIG. 1 is a block diagram of an FM diversity receiver which includes a decision and control circuit embodying the present invention.

Reference first is made to FIG. 1 wherein a frequency modulation (FM) diversity receiver system is shown which includes an FM receiver 12 to which a radio frequency (RF) input signal is supplied over line 14 from one of two antennas 16 or 18 through an RF switch 20. For simplicity a single-pole, double-throw switch 20 is shown which includes a movable contact which is adapted for connection to either antenna 16 or 18 under control of the output from a decision and control unit 22 over line 24. In practice, switch 20 comprises an electronic switch which may include a network of PIN diodes to provide for fast switching between antennas. Prior art RF switches suitable for use in the switched diversity system of this invention are well known and no further description thereof is required.

The FM receiver 12, which may be of conventional design, includes a front end unit 26 to which the antenna signal from one of the antennas 16 or 18 is supplied, dependent upon the condition of RF switch 20. The front end unit includes tuning capabilities for tuning within a frequency band, such as the FM broadcast band in the case of an FM broadcast receiver. Often, RF amplification also is provided at the front end unit.

The output from the front end unit 26 is supplied to a local oscillator, mixer and IF amplifier/limiter unit 28. The RF signal from front end unit 26 is applied to the mixer included in the local oscillator, mixer and IF amplifier/limiter unit 28 where it is combined with the output from the local oscillator. The mixer output is supplied to an intermediate frequency (IF) amplifier/limiter for signal amplification and limiting. If desired, a separate limiter may be employed following IF amplification. Typically, however, limiting action is provided by IF amplifier stages included in the amplifier/limiter portion of unit 28 for removal of amplitude modulation from the IF signal output from unit 28. Current FM broadcast receivers include a local oscillator which operates at a frequency such that, when mixed with the RF carrier frequency of the signal output from the front end unit 26, there is produced an IF signal of 10.7 MHz which is amplified by the IF amplifier/limiter. With a sufficiently strong RF signal input, a strong IF signal of constant amplitude and centered at 10.7 MHz is produced at the output from unit 28. The IF signal is supplied to a frequency discriminator, or detector, 30 for demodulation thereof. The detector 30 responds to the frequency-modulated program material to provide an audio amplitude-modulated (AM) signal which then is amplified by audio amplifier 32. The audio signal output from amplifier 32 is shown connected to loudspeaker 34.

The decision and control unit 22 for controlling antenna switching is responsive to two different input signals supplied thereto from sensing circuits 36 and 38 over lines 40 and 42, respectively. The one sensing circuit 36 includes IF peak level detector means responsive to the IF signal, before limiting, to produce an output related to the amplitude of the received signal. This output reflects signal level changes including amplitude changes produced by multipath fading (including frequency selective fading) over a wide range of input signal levels throughout the frequency range of said input signal. FM receivers often include such a sensing circuit to which a tuning meter is adapted to be connected to facilitate accurate tuning of the receiver by peaking the meter. This "meter" drive signal may be employed as the first input to the decision and control circuit 22 at line 40 thereof if available from a conventional FM receiver 12. Obviously, a sensing circuit responsive to the peak level of the RF signal at the receiver front end unit could be employed in place of sensing circuit 36 which is responsive to the IF signal. In any event, the input signal level must be sensed prior to signal limiting and demodulation thereof in order to obtain a measure of said input signal level over a wide amplitude and frequency range thereof. The dynamic range of the input signal is very large, and the "meter" drive circuit delivers an output that is approximately logarithmically related to the input signal amplitude. If, for example, a 10 dB signal amplitude change results in a 1 volt change in the "meter" drive signal, a 60 dB change would result in a 6 volt change. Severe fades are typically in the order of 30 dB maximum, thereby resulting in approximately a 3 volt change in the output from the sensing circuit 36.

The other sensing circuit 38 is responsive to the receiver signal after limiting, but prior to detection, and in FIG. 1, the input to sensing circuit 38 is shown connected to an output obtained from the local oscillator, mixer and IF amplifier/limiter unit 28. Sensing circuit 38, which includes a level detector and driver, produces an output with useable amplitude fluctuations only when the IF signal has dropped below the limit level of the IF limiter. Consequently, fluctuations in only weak signals are sensed. Again, FM receivers often include a sensing circuit such as circuit 38 for use in a signal muting circuit to quiet the receiver when the signal level falls beneath a predetermined level. This 'mute' control signal may be employed as the second input to the decision and control circuit 22 at line 42 thereof if available from a conventional FM receiver 12. It will be understood, then, that by use of the sensing circuit 38, the dynamic range of the fade control measurements are extended to low level signal inputs. The "meter" drive signal range typically covers an input signal range of 65 dB, and the "mute" output signal adds approximately another 25 dB at the lower end of such range. An integrated circuit designated LM 3089, by National Semiconductor Corporation, Santa Clara, Calif., which includes IF amplifiers, detectors and audio amplifiers and having IF peak level and mute control signal outputs may be employed in the receiver 12, in which case said meter drive and mute control signal outputs therefrom may be supplied as inputs to the decision and control circuit 22 of this invention.

As will become apparent hereinbelow, the "meter" and "mute" signals are combined at the decision and control circuit to provide a composite control signal which provides a wide dynamic range measure of input signal amplitude fluctuations due to multipath fading, which fading results in audible disturbances in the output of the receiver. However, this fade information may be derived from other circuitry added to the receiver including, for example, a separate chip, and the use of receivers having a source of "meter" and "mute" signals is not required. It will be understood, then, that the use of readily available "meter" and "mute" signals is a matter of convenience, only, the invention not being limited to their use.

Fade Features

Multipath fading in mobile FM broadcast reception arises in large part from the summation of a multiplicity of rays resulting from reflecting and refracting obstacles near to the receiver, but that are widely dispersed angularly. There are, therefore, significant path length differences in the many rays which reach the selected antenna. So-called fast fading occurs as a vehicle moves through a region where such reflections and refractions are present. The rate of the fade is dependent upon the vehicle speed; with the signal fluctuations occuring quasiperiodically within less than a wavelength of movement.

So-called slow fading generally occurs over many tens of wavelengths and is ascribable to variations in the terrain profile and the general nature of the environment which influence the relative phase difference of the signals arriving at the selected receiver antenna. As will become apparent hereinbelow, the present decision and control circuit 22 does not respond to such slow fading because of the a-c coupling employed in the connection of the outputs from the sensing circuits to the decision and control circuit 22.

Figures 2A, 2B:
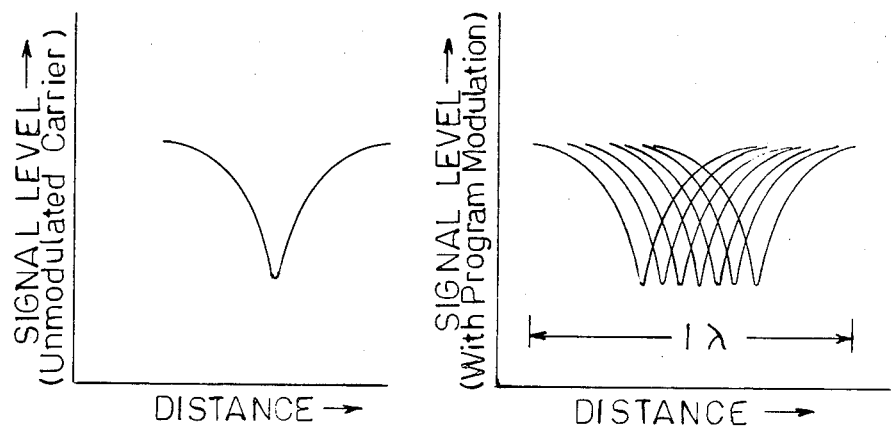
FIGS. 2A and 2B are plots of received signal strength versus distance for an unmodulated carrier and for a signal with program modulation, respectively, in the presence of frequency selective multipath fading.

Frequency selective fading, which is another form, or aspect, of multipath fading, substantially dominates the phenomenon in the FM broadcast case. If the transmission were narrow band, a fade would be shown spacially as sharply defined, as seen in FIG. 2A. There, the signal level of an unmodulated carrier is shown in the presence of a multipath fade. However, FM broadcast is wide band ($\pm 75$ KHz relative to the carrier) and if, as is typical, the multipath rays arrive over paths of substantially different time delays, the points of maximum fade for frequencies far from the carrier will be spacially distributed. As seen in FIG. 2B, instead of a fade point, the fade becomes a fade region extending easily over a major fraction of a wavelength. When the program material utilizes the full channel bandwidth, the potential multipath interference is extended spacially and in outage time as far as the mobile receiver reception is concerned.

As noted above, this frequency selective fading is program dependent, and results from FM modulation. Consequently, selective fading can occur whether or not the vehicle carrying the receiver is moving, and can adversely affect reception within microseconds. It accounts for a major amount of the actual multipath disturbances heard in the receiver output, and typically coincides with fast, deep, fades described above. The high frequency content of the frequency selective fades extends to the hundreds of kilohertz, and the decision and control unit 22 of this invention is adapted to respond to such high frequency fade signal components to facilitate rapid antenna switching in the presence thereof.

A practical aspect of these features of frequency selective fading is a substantial increase in the time during which signals from both antennas 16 and 18 of the FM broadcast diversity receiver are simultaneously corrupted, since signal disturbances are dependent upon both vehicle movement and upon program content. (With narrow band FM broadcasting disturbances due to program content are minimal because of the narrow frequency bandwidth employed.) This is true even though the two antennas 16 and 18 of the diversity receiver have differences in antenna response due, for example, to different polarizations, or angles, and/or by reason of their being suitable separated. With the present decision and control unit 22, the lesser disturbed antenna is selected without repeatedly switching between antennas, and with a minimum number of antenna switching operations. As will become apparent hereinbelow, the threshold voltage at which antenna switching operation is initiated is reset prior to switching antennas, rather than after the antenna switching operation, whereby switching back to the first antenna does not take place if the signals from both antennas are corrupted, but the disturbance at the antenna to which the system was switched is less than the maximum disturbance at the antenna from which the receiver was switched.

Decision and Control Unit

Figure 3:
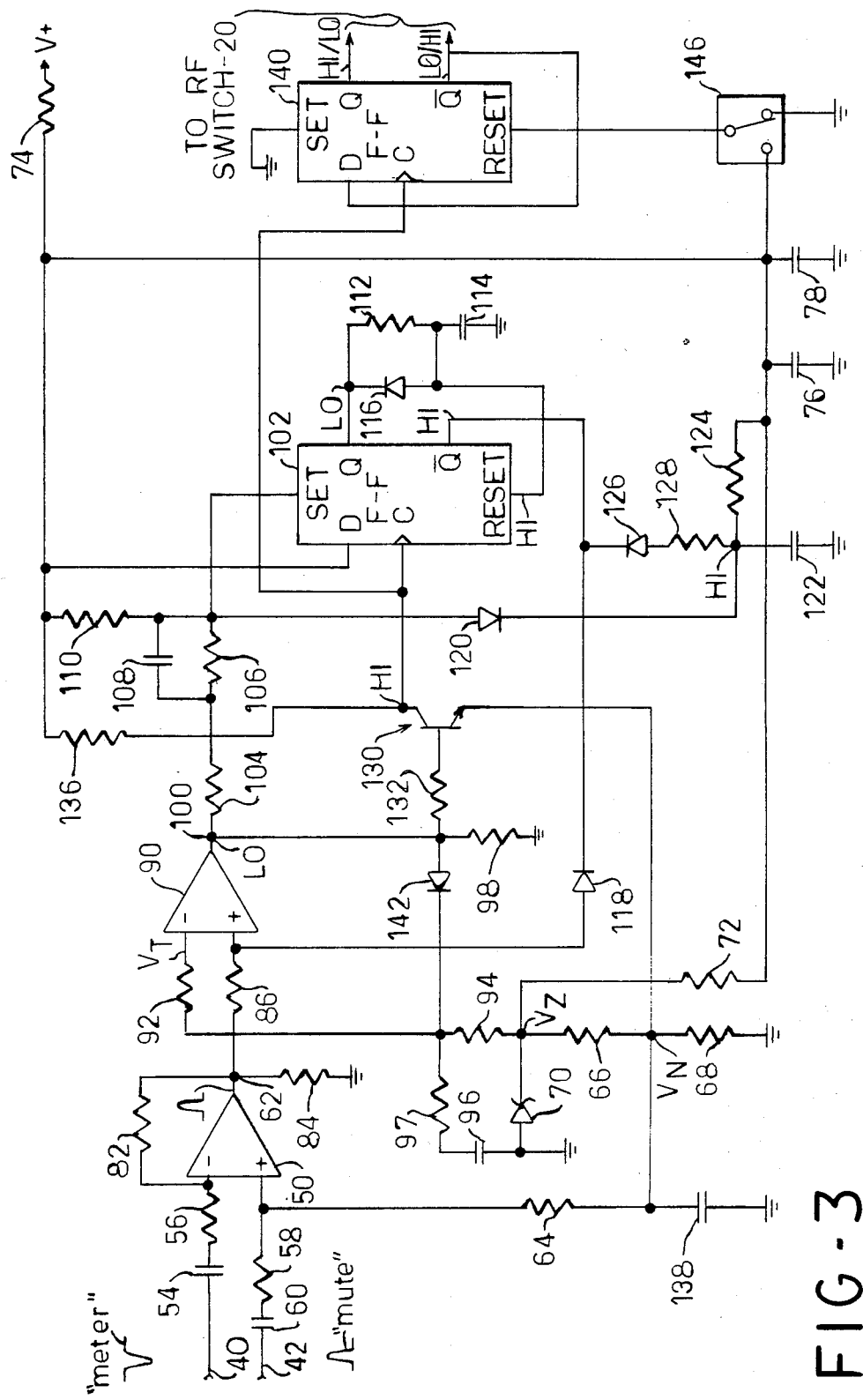
FIG. 3 is a schematic diagram of a decision and control circuit which embodies the present invention.

Reference now is made to FIG. 3 wherein the decision and control unit 22 is shown in greater detail. The unit includes an operational amplifier (op-amp) 50 to which the outputs from sensing circuits 36 and 38 are supplied over lines 40 and 42, respectively. The IF peak level (or "meter") signal at line 40, from sensing circuit 36, is connected to the inverting input (−) of op-amp 50 through a coupling capacitor 54 and resistor 56. Capacitor 54 provides an a-c coupling of the fade signal from sensing circuit 36 into the inverting input of the op-amp 50.

The IF level (or "mute") signal at line 42 from sensing circuit 38 is connected to the non-inverting input (+) of op-amp 50 through a series resistor 58 and coupling capacitor 60. A fade appears as a voltage decrease at line 40 and, if the fade is deep, as a voltage increase at line 42. The fade signals are combined and amplified in op-amp 50, whereupon a fade appears as a voltage increase at the op-amp output 62.

A d-c input signal level is established at the non-inverting input (+) of op-amp 50 by connection thereof to a fixed d-c voltage source through a series resistor 64. The d-c voltage level, identified as $V_N$ in FIG. 3, is obtained by connection of resistor 64 to the junction between voltage dividing resistors 66 and 68 which, in turn, are connected between a regulated d-c source and ground. A Zener diode 70 sets the regulated d-c level, $V_z$, for the voltage divider resistors 66 and 68. The Zener diode 70 is connected through a voltage dropping resistor 72 to a d-c voltage supply V+. A filter network comprising series resistor 74 and shunt capacitors 76 and 78 decouple the decision and control unit from other circuits connected to supply V+. Because of the a-c coupling of fade signals to the op-amp 50, the d-c voltage, $V_N$, applied to the non-inverting input (+) of op-amp 50 from the regulated supply also appears at the inverting input (−) and op-amp output 62. This, then, establishes the nominal control voltage in the absence of fade control input signals to the decision and control unit.

As noted above, the IF level, or "mute" signal is coupled to op-amp 50 through resistor 58 and capacitor 60. The low frequency cut off for the IF level signal, set by the resistors 58 and 64 in combination with capacitor 60, is established at a relatively high frequency. By this means, low frequency signal components (possibly injected by other receiver circuit functions) are removed from the "mute" control signal, while the higher frequencies representative of noise and distortion resulting from deep multipath fades and noise are passed to the input of op-amp 50. As noted above, much of the fade control information necessary for operation of the present system is contained in the "meter" circuit output obtained from sensing circuit 36, and the "mute" control signal output is combined with the "meter" circuit output at op-amp 50 to extend the input signal range over which the system operates. If desired, the system may be operated without the use of the "mute" control signal, in which case the input signal range over which the decision and control circuit operates would be limited to that provided by the "meter" control signal output. Also, as noted above, a unitary signal sensing circuit which is operable over the full dynamic range of input signals may be employed in place of the "meter" and "mute" control signal outputs. As mentioned above, these signal outputs often are employed for convenience since receivers having such outputs presently are available.

A feedback resistor 82 is connected between the output 62 and inverting input (−) of the op-amp 50. This resistor, in conjunction with resistor 56, sets the gain of op-amp 50 for control signal fluctuations to the ratio of resistor 82/resistor 56 for the "meter" circuit components, and to 1+resistor 82/resistor 56 for the "mute" circuit components. However, the gain value provided thereby is too high for "mute" circuit components relative to that accorded the much wider dynamic range "meter" circuit coverage. Resistors 58 and 64 comprise a voltage divider that reduces the magnitude of the "mute" circuit fluctuations present at the non-inverting input to the desired range. A load resistor 84 for op-amp 50 is connected between the op-amp output and ground.

The fade signal present at the output 62 from op-amp 50 is coupled through resistor 86 to the non-inverting (+) input of a second op-amp 90. A nominal reference threshold voltage, $V_T$, is supplied to the inverting input (−) of op-amp 90 by connection of the inverting input (−) to the regulated d-c voltage, $V_z$, (established by Zener diode 70) through resistors 92 and 94. Resistor 92 functions as a current-limiting resistor for protection of op-amp 90. A series-connected capacitor 96 and resistor 97 are connected between ground and the junction between resistors 92 and 94, which capacitor is charged through resistors 94 and 97 to the threshold voltage level, $V_T$. Since the operational amplifier has an input impedance which is substantially infinite, the threshold voltage, $V_T$, at capacitor 96 also appears at the inverting input (−) of op-amp 90. A load resistor 98 for op-amp 90 is included between the output terminal 100 thereof and ground.

Normally, so long as the fade signal at the non-inverting input (+) of op-amp 90 does not exceed the threshold value, $V_T$, the output from the op-amp is low (LO). In FIG. 3, stable-state voltage conditions are indicated by use of the terms HI and LO wherein HI indicates a voltage approximately equal to V+ and LO indicates a voltage approximately equal to ground potential. When the fade signal level at the non-inverting input (+) of op-amp 90 exceeds the threshold voltage, $V_T$, at the inverting input (−), the output from op-amp 90 rises above the LO level. Under the above-described operating condition, op-amp 90 functions as a comparator; with the output thereof going above the LO state only when the fade input signal exceeds the threshold voltage level.

Assume, for purposes of illustration only, that a voltage, $V_z$, of 5.4 v is established by the Zener diode 70, and that the voltage divider resistors 66 and 68 are selected to provide for a nominal voltage, $V_N$, of 4.9 v. This 4.9 v voltage level, $V_N$, is applied through resistor 64 to the non-inverting input (+) of op-amp 50 and, as noted above, in the absence of fade control signal inputs, the same 4.9 v level appears at the inverting input (−), and at the output 62, of op-amp 50. The $V_N$ voltage output from op-amp 50 is coupled through resistor 86 to the non-inverting input (+) of op-amp 90 to establish the voltage level thereat at 4.9 v. With capacitor 96 in the discharged condition, the 5.4 v Zener diode voltage, $V_z$, is supplied to the inverting input (−) of op-amp 90, whereby a 0.5 v voltage differential is provided at the inputs of op-amp 90. In this case, a voltage increase of 0.5 v at the non-inverting input (+) of op-amp 90 (from the output of op-amp 50) is required for the op-amp 90 output to switch from the LO condition.

Normally, the d-c level of the "meter" fade control signal at input 40 to the decision and control unit ranges from approximately zero (0) to five (5) volts, depending upon the received signal strength; the stronger the received signal the higher the "meter" signal. Since the "meter" and "mute" fade control signals are a-c coupled to the decision and control unit through coupling capacitors 54 and 60, the d-c components of the "meter" and "mute" fade control signals are blocked from the op-amp 50 inputs. Therefore, regardless of the d-c level of the input signals to the decision and control unit, the voltage difference at the inverting and non-inverting inputs of op-amp 90, in the steady input signal state, equals $V_z-V_N$, which, in the illustration is 0.5 v. It will be seen, then, that a signal disturbance which results in an op-amp 50 output of 0.5 v, or greater is required for the op-amp 90 output to begin to rise. As will become apparent herein, capacitor 96 is charged above the Zener diode voltage $V_z$ whenever the op-amp 90 rises above the LO steady state level, to raise the threshold voltage, $V_T$, level by an amount related to the input signal disturbance reflected in the fade control signal.

The output from op-amp 90 is supplied to several circuits, one of which includes the SET input of a monostable flip-flop 102. As seen in FIG. 3, the output terminal 100 of op-amp 90 is connected to the SET input of monostable 102 through a resistor 104 in series with shunt resistor 106 and capacitor 108. Resistors 104 and 106 are included in a voltage divider network which also includes a resistor 110, which voltage divider is connected between the high V+ bus and the op-amp 90 output. In the steady-state condition, wherein the op-amp 90 output is LO, the voltage at the SET input of monostable 102 is established at a value which is below the triggering level of the one-shot. In one type of monostable construction, the triggering level is equal to V+/2. Here, the voltage divider is used to set the steady-state voltage level at the monostable SET input to, say, 0.4 V+. Resistor 104 is included for protection purposes, and has a very small resistance value compared to the other resistors 106 and 110 in the voltage divider. Consequently, substantially the full 0.4 V+ voltage at the SET input is stored by the capacitor 108. When the output from op-amp 90 rises in response to a fade signal input in excess of the threshold level, the output voltage is transferred to the SET input thereby triggering the monostable on the leading edge of the op-amp output. The time constant of resistor 106-capacitor 108 is long compared to the op-amp output voltage rise time, but short relative to a 12-microsecond gate period provided by said monostable as described hereinbelow.

Under steady-state conditions, the Q output of monostable 102 is LO and the $\overline{Q}$ output is HI and, when the one-shot is triggered, the $\overline{Q}$ output goes LO and the Q output goes HI. The time during which the monostable outputs are switched is set by an RC network included in the connection of the Q output to the RESET terminal thereof. As seen in FIG. 3, the Q output of monostable 102 is connected to ground through a series connected resistor 112 and capacitor 114, with the junction between said resistor and capacitor being connected to the RESET terminal. When the Q output goes HI, capacitor 114 is charged through resistor 112 and, when the capacitor voltage reaches V+/2, the monostable is reset to the stable condition. The time constant set by the RC timing network fixes the time period of the monostable somewhat in excess of the impulse response time of receiver 12, as reflected in the "meter" control signal output from sensing circuit 36 (see FIG. 1). From the above, it will be seen that the time period of monostable 102 is at least equal to the pre-detection impulse response time of receiver 12. The selected time period may range, for example, from 5 to 20 microseconds, with about a 12 microsecond period being typical. A diode 116 is provided in shunt with the timing resistor 112 whereby, at the termination of the monostable output, the capacitor 114 is discharged immediately through the forward-biased diode to the now LO Q output.

The $\overline{Q}$ output from monostable 102 is connected through a diode 118 to the non-inverting input (+) of op-amp 90. In the steady-state condition, wherein $\overline{Q}$ is HI, diode 118 is reverse-biased to effectively disconnect the (+) input of op-amp 90 from the $\overline{Q}$ output of monostable 102. Whenever monostable 102 is triggered, $\overline{Q}$ goes from HI to LO, and diode 118 is forward biased whereupon the non-inverting input (+) of op-amp 90 is clamped to the LO output level at $\overline{Q}$. It will be understood then that op-amp 90 is, essentially, gated off by the $\overline{Q}$ output from monostable 102 in the triggered condition. Resistor 86, which couples the output of op-amp 50 to op-amp 90, also serves to isolate the operational amplifiers, allowing the (+) input of op-amp 90 to be brought LO during the gating period provided by monostable 102 while the fade control signal remains available at the low impedance output from op-amp 50. When the gate control signal to op-amp 90 is terminated, in approximately 12 microseconds, the fade signal output from op-amp 50 is immediately impressed upon the non-inverting input (+) of op-amp 90.

The SET input of monostable 102 is connected through a diode 120 to a capacitor 122. In the steady-state condition, capacitor 122 is charged to a HI voltage by connection thereof through a resistor 124 to the V+ bus. In the charged condition of capacitor 122, diode 120 is reversed biased thereby effectively disconnecting capacitor 122 from the SET input of monostable 102. This allows for the above-described SET input triggering of monostable 102.

The $\overline{Q}$ output of monostable 102 is connected to the capacitor 122 through a diode 126 and resistor 128. In the steady-state condition, wherein the $\overline{Q}$ output is HI, diode 126 is reverse-biased thereby effectively disconnecting the $\overline{Q}$ output from capacitor 122. When triggering occurs, and $\overline{Q}$ goes LO, diode 126 is forward-biased whereupon capacitor 122 discharges through resistor 128 and diode 126. Resistor 128 limits the input current flow from capacitor 122 to the $\overline{Q}$ output of monostable 102 to a value acceptable to the $\overline{Q}$ output. The R-C time constant of resistor 128 and capacitor 122 is selected such that capacitor 122 can discharge to a LO state during the 12 microsecond time gate period.

With capacitor 122 at a LO voltage, diode 120 is forward biased and the SET input of monostable 102 is clamped LO, at a level slightly above ground potential by the amount of the voltage drop across diodes 120 and 126. In this condition SET input triggering cannot take place, which condition is maintained until capacitor 122 is recharged through resistor 110 and resistor 124 to a voltage above V+/2. The recharging time for capacitor 122 is set by the time constant of capacitor 122 with the resistors 110 and 124. It will be noted that resistor 110 supplies charging current only so long as diode 120 is forward biased. With this arrangement, once monostable 102 has been triggered by either SET input triggering, described above, or clock input triggering, described below, SET input retriggering is prohibited for approximately 200 microseconds during charging of capacitor 122.

The output from op-amp 90 also is supplied to a transistor 130 which operates in a switching mode. The op-amp output is connected to the base electrode of the transistor through coupling resistor 132.

The collector of transistor 130 is connected to the V+ bus through a load resistor 136, and the transistor emitter is connected to the junction between voltage divider resistors 66 and 68 to provide an emitter bias of $V_N$ (the same nominal voltage which is applied to the non-inverting input of op-amp 50 in the steady-state condition of the system). A shunt capacitor 138 holds the emitter bias steady during the short conduction cycle of the transistor.

Transistor 130 conducts whenever the output voltage from op-amp 90 rises above the emitter bias level, at which time the base-emitter junction is forward biased. Coupling resistor 132 limits the base current appropriately. The transistor collector, which normally is HI, is connected to the CLOCK input of monostable 102, and to the CLOCK input of a flip-flop 140 which operates in a bi-stable mode. Flip-flops 102 and 140 are triggered simultaneously on the rising slope of the output pulse from transistor 130.

In the steady-state, cut-off, condition of transistor 130, the collector is at a HI voltage. Then, when the transistor conducts, the collector voltage is reduced to approximately the emitter voltage level. The CLOCK voltages of the two flip-flops are thereby brought well below the V+/2 level during transistor conduction. However, as noted above, the flip-flops are not clocked by such a negative-going waveform, but instead are clocked only when transistor 130 is switched back to the cut-off state whereupon the collector returns to the HI voltage state. The collector voltage remains depressed until the op-amp 90 has finished resetting the threshold level at threshold capacitor 96 in the manner described below.

As seen in FIG. 3, the op-amp 90 output is connected to the threshold capacitor 96 through diode 142 and resistor 97. In the steady-state condition, wherein the op-amp 90 output is LO, the diode 142 is reverse-biased and threshold capacitor 96 is isolated from the op-amp output. When the op-amp 90 output is high and diode 142 is brought into conduction, a heavy charging current is delivered to threshold capacitor 96, resetting its voltage i.e. the threshold level, to correspond to the peak value of the observed multipath disturbance reflected in the momentary fade signal input at the non-inverting input (+) of op-amp 90. When the threshold value $V_T$ developed across capacitor 96 reaches the fade input signal level at the non-inverting input (−), charging of threshold capacitor 96 stops. This operation is facilitated by resistor 97 which slightly modifies the charging time constant (resistor 97 being of a very small value). As noted above, when the output voltage of op-amp 90 returns to a LO voltage, the collector of transistor 130 goes HI, and the positive-going clock pulse is applied to the CLOCK inputs of both the monostable 102 and bistable flip-flop 140 to trigger the same. The operation of monostable 102, in the generation of a gate control signal of approximately 12 microseconds to momentarily disable the decision and control circuit, and in the generation of an inhibit signal to inhibit SET triggering of the monostable for approximately 200 microseconds, following triggering of the monostable, is described above.

Bi-stable flip-flop 140, when clocked, causes antenna switching by actuation of RF switch 20. The DATA input of flip-flop 140 is connected to the $\overline{Q}$ output therefrom for operation thereof in a toggle mode. The Q and $\overline{Q}$ outputs, which change level each time the flip-flop is toggled, are connected to the RF switch 20 (FIG. 1) for switching antennas 16 and 18. Thus, the antenna which is connected to the receiver 12 is changed each time the flip-flop 140 is toggled.

A "defeat" switch 146 is connected to the RESET input of flip-flop 140, through which switch the RESET input is adapted for connection to either the V+ bus or to ground. For normal operation, the switch is in the illustrated position wherein the RESET input is grounded. When connected to V+, the HI voltage at the RESET input overrides any clocking action, and the system is set for operation with only one of the two antennas.

Operation of Decision and Control Unit

Figure 4:
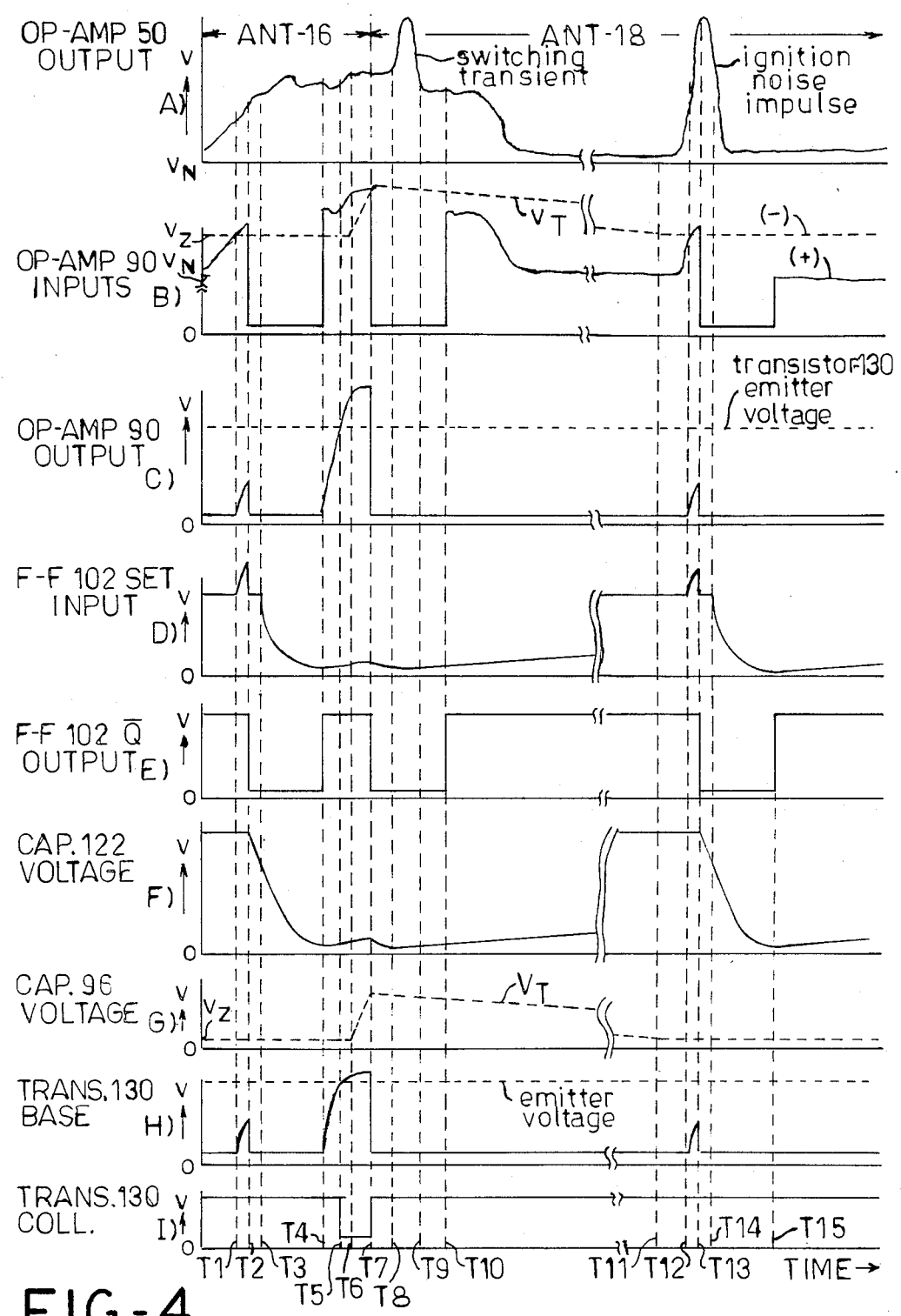
FIGS. 4A through 4I are plots of signal amplitude versus time at various points in the decision and control circuit for use in explaining operation thereof.

Operation of the novel decision and control unit will better be understood from a description thereof with reference to waveforms shown in FIG. 4. The decision and control circuit is arranged to receive information from the two sensing circuits 36 and 38; one of which circuits, 36, produces an output related to the peak value of the receiver signal before receiver signal limiting and detecting, and the other of which circuits, 38, produces an output related to the level of the receiver signal after receiver signal limiting but before detection. Outputs from the "meter" and "mute" drive circuits included in prior art FM receivers may be employed as inputs to the decision and control circuit of this invention. As seen in FIG. 3, a fade appears as a voltage decrease in the "meter" drive signal, and, if the fade is deep, as an increase in the "mute" circuit signal. The fade signals are a-c coupled to op-amp 50 through coupling capacitors 54 and 60 where they are combined and amplified and appear as a voltage increase at the op-amp output. At FIG. 4A, the output from op-amp 50 is shown, together with the times during which the antennas are connected to the receiver. As seen in FIG. 4, antenna switching takes place at time T7. Arbitrarily, antenna 16 is shown connected to the receiver before time T7, and antenna 18 is shown connected to the receiver after switching at time T7. It here will be noted that the waveforms depicted in FIG. 4 are not drawn to scale in either amplitude or time, but, simply are intended to facilitate an understanding of the operation of the decision and control unit 22.

The inverting (−) and non-inverting (+) inputs to op-amp 90 are shown at B of FIG. 4. The non-inverting input (+) corresponds to the fade control signal output (FIG. 4A) except for periods between T2 and T4, T7 and T10, and T13 and T15 when the non-inverting input is brought LO by said $\overline{Q}$ output from monostable 102 (FIG. 4E) when the $\overline{Q}$ is LO to momentarily disable operation of the decision and control circuit during such periods.

The op-amp 90 output (FIG. 4C) remains LO so long as the fade control signal at the non-inverting input (+) remains below the threshold level $V_T$ at the inverting input (−), during which time op-amp 90 acts as a comparator. When the voltage at the non-inverting input (+) is brought above the threshold level at the inverting input (−) (FIG. 4B) at time T1, by a fade or noise signal output from op-amp 50 (FIG. 4A) the output voltage from op-amp 90 (FIG. 4C) starts to rise from the LO voltage level. This voltage increase is impressed upon the SET input of monostable 102 (FIG. 4D) via resistor 104 and shunt resistor 106 and capacitor 108.

When the SET voltage reaches triggering level at $V+/2$, following a rise on the order of 1.5 to 2 volts, monostable 102 is triggered at time T2. It here will be noted that only flip-flop 102, and not flip-flop 140 is triggered at this time. Upon SET triggering of flip-flop 102, the $\overline{Q}$ output (FIG. 4E) immediately goes from HI to LO for approximately 12 microseconds, between times T2 and T4; the $\overline{Q}$ pulse width being determined by the R-C time constant of resistor 112 and capacitor 114. When the $\overline{Q}$ output goes low, the following functions occur:

(1) Conduction through now-forward biased diode 118 clamps the non-inverting input (+) of op-amp 90 to $\overline{Q}$ for the following 12-microsecond interval at time T2, FIG. 4B;

(2) Because the non-inverting input voltage is brought below the inverting input (−) threshold level, regardless of the output voltage level of op-amp 50, the output voltage of op-amp 90 is driven low at time T2, FIG. 4C;

(3) With the output of op-amp 90 again LO, the SET voltage input to monostable 102 returns to approximately $0.4\,V+$, as set by voltage divider resistors 104, 106 and 110;

(4) During the 12-microsecond interval (from time T2 to T4) the charge on capacitor 122 drains to $\overline{Q}$ (LO) through diode 126 and resistor 128, whereupon the capacitor voltage goes from HI to LO, as seen in FIG. 4F; and (5) As the capacitor 122 voltage falls below the extant voltage at the SET input of monostable 102, at time T3, diode 120 is brought into conduction and the SET voltage (FIG. 4D) is brought LO, clamped to the capacitor 122 voltage through diode 120.

In approximately 12 microseconds, at time T4, monostable 102 reverts to its stable state, at which time the $\overline{Q}$ output goes HI (FIG. 4E). The clamp on the fade control voltage applied to the non-inverting input (+) of op-amp 90 is released, and that voltage again equates with the fade control signal output from op-amp 50. If the disturbance signal to decision and control unit that initiated the above-described sequence is now terminated, op-amp 90, functioning as a comparator, remains off, with the output therefrom LO. If, on the other hand, the disturbance signal has not yet terminated when the clamping voltage is released from the non-inverting input (+) to op-amp 90 (or if the disturbance appears within several microseconds following the clamping period) the signal will be manifested by a voltage recovery at said non-inverting input above the threshold level at the inverting input (−) thereof. This latter condition is depicted in FIGS. 4A and 4B at time T4.

When the clamping voltage is released, at time T4, the fade control signal output from op-amp 50 (FIG. 4A) is manifested at the non-inverting input to op-amp 90. Because the fade control signal at the non-inverting input exceeds the reference threshold voltage (FIG. 4B) the output from op-amp 90 again rises (FIG. 4C). This time, the rising output voltage from op-amp 90 does not trigger monostable 102 via the SET input since the SET input is clamped LO through connection thereof to the now-discharged capacitor 122 through diode 120 (FIG. 4F). Consequently, the voltage rise in the op-amp 90 output voltage continues through that value that caused triggering of monostable 102 at time T2, now without event.

As seen in FIG. 4C, at time T5, the voltage rise at op-amp 90 output passes through the fixed-bias level at the emitter of transistor 130, which level is higher than the level which produced SET triggering of monostable 102. Transistor 130 then saturates and the collector is immediately brought LO to near the emitter bias, which is well below $V+/2$, thus arming the system for eventual CLOCK triggering of flip-flops 102 and 140. (FIGS. 4H and 4I.) As noted above, flip-flops 102 and 140 are triggered with LO to HI transitions from a value below $V+/2$ to a value above $V+/2$, and therefore are not triggered until the collector voltage of transistor 130 rises through $V+/2$.

The voltage rise at the output 100 from op-amp 90 quickly exceeds the reference threshold voltage level on the inverting input (−) of op-amp 90; that level, $V_T$ nominally, being set by Zener diode 70. At time T6, when op-amp 90 stops its comparator action and begins to function as a peak detector, diode 142 is brought into conduction, and a heavy charging current is delivered to capacitor 96, resetting the reference threshold level to correspond to the peak value of the observed multipath disturbance reflected in the momentary non-inverting input (+) of op-amp 90. Only when equality between the inverting and non-inverting inputs is reached does charging of capacitor 96 stop. In FIG. 4G, the charge on capacitor 96 is shown to increase starting at time T6, when diode 142 starts to conduct, and continues to increase until time T7, when diode 142 returns to a non-conducting state. Increased charging of capacitor 96 by the conduction of diode 142 raises the capacitor voltage above $V_z$, thereby increasing the threshold voltage level $V_T$ at the inverting input (−) of op-amp 90. The amount by which the threshold voltage, $V_T$, is raised above the Zener diode level, $V_z$, is related to the magnitude of the input signal disturbances to the receiver, as reflected in disturbances in the fade control signal(s) at the input to the decision and control unit. Therefore, with each antenna switching operation, the threshold voltage, $V_T$, is reset by increasing the charge on capacitor 96 in a amount related to the magnitude of the signal disturbance which produced the antenna switching operation. As seen in FIG. 4G, at time T7, capacitor 96 starts to discharge, and reaches the steady-state, $V_z$, level at time T11, at which time the voltages at the inverting (−) and non-inverting (+) inputs of op-amp 90 return to $V_z$ and $V_N$, respectively, which provides for a voltage difference of 0.5 v at said op-amp inputs in the above-described illustration.

When the output voltage of op-amp 90 goes LO (FIG. 4C) transistor 130 is biased off and the collector immediately goes HI (FIG. 4I, Time T7). This results in a positive-going clock pulse which is applied to the CLOCK inputs of both flip-flops 102 and 140 to trigger the same.

As noted above, the output from bistable flip-flop 140 is used to control the RF switch 20 for switching between antennas 16 and 18. The change of state in flip-flop 140 results in an immediate (microsecond) switch to the alternate antenna and, in FIG. 4A, switching from antenna 16 to antenna 18 is seen to take place at time T7 when flip-flop 140 is CLOCK triggered. From that moment, the fade control signal employed by the decision and control unit 22 is derived from the reception conditions for antenna 18. As noted above, switching transients may be (but are not necessarily) reflected in the fade control signal, and, at FIG. 4A, the antenna switching operation is shown to have produced a disturbance in the op-amp 50 output between times T8 and T9. Switching disturbances such as that illustrated at FIG. 4A typically are less than 10 microseconds in duration. It will be noted that the disturbance does not appear at the output from op-amp 90 because the non-inverting input (+) thereto is clamped LO for approximately 12 microseconds (between times T7 and T10) by the LO $\overline{Q}$ output from flip-flop 102 which also was triggered, this time via the CLOCK input.

It will be understood, then, that there is a repeat of the above-described sequence of events attending the first triggering of monostable 102. Now, however, the decision and control circuit is presented with control information from sensing circuits 36 and 38 accurately reflecting only the receiver performance when fed by the antenna 18. From FIGS. 4A and 4B, it will be seen that antenna 18 is also disturbed; the fade control voltage at the non-inverting input (+) to op-amp 90 being above the nominal reference threshold voltage level $V_T$ at the inverting input (−) thereto. However, antenna 18 is less disturbed than antenna 16 was when switching occured, as indicated by the fact that the fade control voltage is below the new threshold voltage level, which threshold level was increased by measurement of the fade control signal from the first antenna 16 prior to switching to antenna 18 at time T7. Consequently, the system does not again switch antennas, preferring the lesser disturbed signal.

Had the second antenna 18 been more disturbed, the system would again switch antennas, but only after measuring the disturbance level at the second antenna 18 and increasing the reference threshold voltage level accordingly.

Since the multipath disturbance conditions are highly dynamic, the reset reference threshold value is not maintained. The reset threshold voltage returns to the nominal threshold value by the discharge of capacitor 96 to the Zener diode value $V_Z$ through resistors 94 and 97. A resistor (94+97)-capacitor (96) time constant which results in discharge of the capacitor 96 to the nominal threshold voltage level in, say, 0.01 to 0.1 seconds may be employed. Of course, the time required to return to the nominal level depends upon how far above said level capacitor 96 is charged during the threshold resetting period. In FIG. 4B, the reference threshold level, $V_T$, is shown to have returned to nominal value, $V_Z$, at time T11. It will be understood, however, that whenever a disturbance level exceeds the then present threshold level (i.e. the threshold level before discharge of capacitor 96 to the nominal threshold value) the comparative action, accompanied by threshold resetting and antenna switching, takes place.

Operation of the novel decision and control circuit for gating out corrupting ignition impulses, or like short-duration pulse signals, is illustrated in FIG. 4 starting at approximately time T12. The op-amp 50 output (FIG. 4A) produced by the noise pulse is seen to exceed the reference threshold voltage $V_T$ at time T12 (FIG. 4B). The resultant voltage increase at the op-amp 90 output (FIG. 4C) is impressed upon the SET input of flip-flop 102 and, when the SET voltage reaches $V+/2$, at time T13, triggering of flip-flop 102 occurs. When monostable flip-flop 102 is triggered, the same above-described events which occured with the triggering thereof at time T2 occur; i.e. the non-inverting input (+) of op-amp 90 is clamped LO by conduction of diode 118 (FIG. 4B); the op-amp 90 output is brought LO (FIG. 4C); the SET input to monostable flip-flop 102 returns to approximately 0.4 V+ (FIG. 4D); the charge on capacitor 122 drains from a HI to a LO state (FIG. 4F); and starting at time T14, the SET input to monostable 102 (FIG. 4D) is brought LO as capacitor 122 discharges.

At time T15, when monostable 102 reverts to its stable state, the clamp on the fade control voltage at the non-inverting input (+) of op-amp is released, and the voltage thereat again equates with the fade control signal output from op-amp 50. The transient (here, the ignition noise pulse) that initiated the sequence of events has now terminated, whereby the comparator (op-amp 90) remains off, with the non-inverting input (+) LO. It will be seen that no antenna switching was produced by the ignition noise pulse because transistor 130 was not brought into conduction. It did not conduct because the output voltage of op-amp 90 (FIG. 4B) did not rise above the emitter bias of the transistor. The output voltage of op-amp 90 was prevented from reaching the transistor switching level because monostable 102 first was triggered by application of the op-amp output to the SET input of monostable 102. It will be understood that the rise time for op-amp 90 as a comparator is fast but finite, on the order of several volts per microsecond, whereas the monostable 102 action time is relatively shorter, on the order of, say, 150 nanoseconds. Therefore, even with large and steep noise signal pulses, monostable 102 is triggered by the SET input from op-amp 90 before transistor 130 is switched to the conducting state.

In approximately 200 microseconds, the time being controlled by recharging of capacitor 122 through resistors 110 and 124, the decision and control system is again prepared to handle another isolated pulse in the above-described manner. The time period of 200 microseconds is much less than the time to the next ignition pulse produced by the engine of the vehicle in which the novel diversity receiver system is installed.

With the present system, corrupting influences of ignition noise and switching transients are gated out in the time domain. As a result, outside of such periods of disablement, the system is responsive to the full measure of the multipath disturbance, in both amplitude and frequency. As noted above, the magnitude of frequency selective fading manifestations accord well with the magnitude of the audible disturbance in the receiver output signal. With the present invention, a measure of peak disturbance level, not just the depth of the fade in aggregate signal power, is obtained, and antenna selection is based on relative disturbance levels rather than on aggregate signal strength comparisons.

Figure 5:
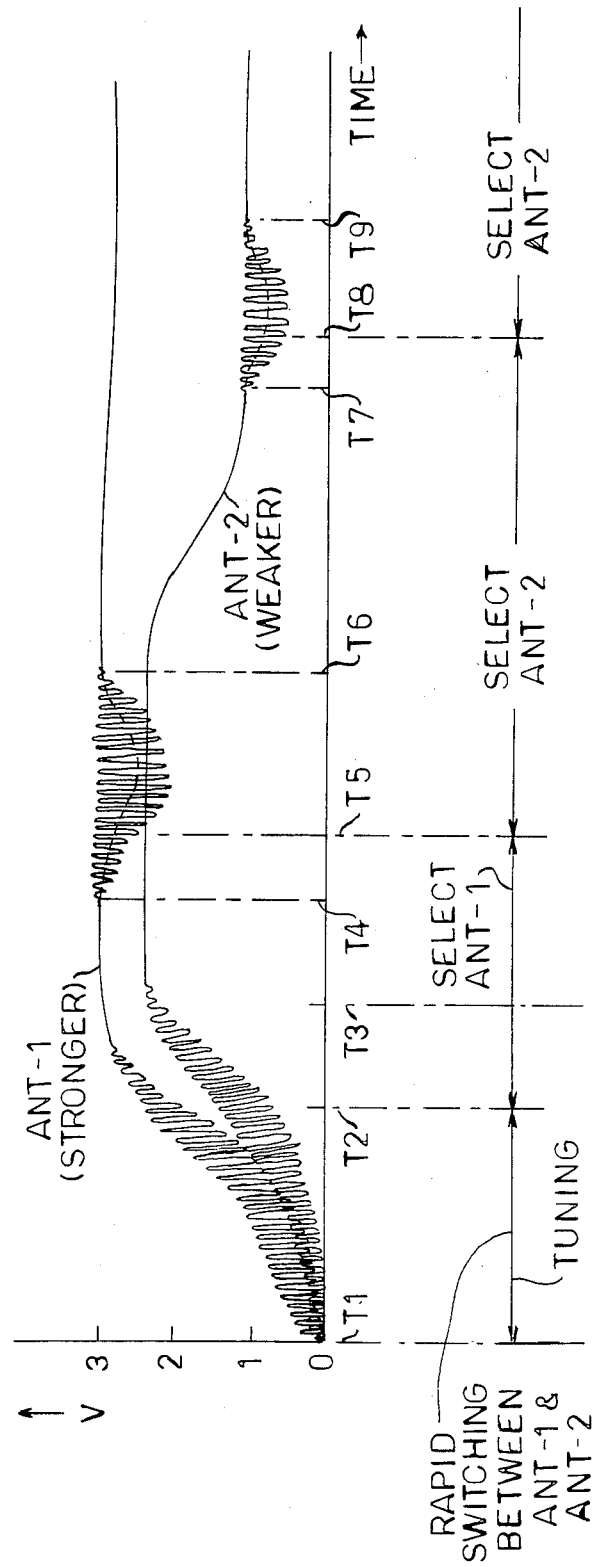
FIG. 5 shows plots of first and second received signals for use in explaining operation and advantages of the present invention.

Advantages of the present invention will be better understood from an examination of FIG. 5 in which first and second receiver signals, identified as ANT-1 and ANT-2, are shown. The signals are representative of the output signal from, say, the front end of a receiver; with one signal being produced by connection to a first antenna, such as antenna 16, and the other signal being produced by connection to a second antenna, such as antenna 18. In FIG. 5, tuning in to a distant station is depicted between times T1 and T3. Initially, at time T1, both signals are not only very weak, but both are disturbed because the receiver is mistuned. With the present decision and control circuit, rapid switching between antennas occurs between times T1 and T2 while the receiver is first being tuned to the transmitted signal, because the measured disturbance levels of both antennas typically exceed the threshold values. As tuning proceeds, the system remains switched to the stronger signal, here ANT-1, because the change in level down in going to ANT-2 is interpreted as a fade, which it is, whereupon antenna switching occurs and the threshold is reset. While the a-c coupling discriminates against response to slow changes in aggregate signal strength, the abrupt change produced by switching is transferred as a control signal—as a fade, if the level drops.

A frequency selective fade is depicted at ANT-1 between times T4 and T6 of FIG. 5, during which time the signal at ANT-2 remains clear. When the peak disturbance exceeds the existing threshold level, $V_T$, at time T5, ANT-2 is selected, and the threshold is reset. If the resultant change in the fade signal strength produced as a result of switching to the weaker signal does not produce a fade control signal of sufficient magnitude to exceed the reset threshold level, ANT-2, which supplies the weaker signal, will remain the selected antenna. Only when the disturbance level at ANT-2 results in a fade control signal of sufficient magnitude to exceed the threshold voltage, $V_T$, will switching back to the stronger signal at ANT 1 take place. Generally, weaker signals are more suseptible to signal disturbances than stronger signals, whereby reception of the stronger signal predominates.

With the present system, switching decisions are based upon the strength of the signal disturbance, and not alone upon the aggregate signal strength. In FIG. 5, the aggregate signal strength for ANT-1 is shown in broken lines between times T4 and T6. With many prior art diversity receiver systems, which base the antenna switching decision upon a measure of aggregate signal strength, a disturbance such as that depicted in FIG. 5 for ANT-1 between times T4 and T6 would not result in an antenna switching operation. Yet, as noted above, disturbances often result in audible signal noise and, by switching antennas in response to such disturbances, reception often is greatly improved.

A relatively large drop in signal strength, of approximately 1 volt, for ANT-2 is depicted in FIG. 5 between times T6 and T7. This change, which represents a "slow fade", does not result in an antenna switching operation since the capacitance coupling to op-amp 50 prevents such a change from being reflected at the inputs to op-amp 50. A signal disturbance at ANT-2, between times T7 and T9, reaches a peak-to-peak level at time T8 which level exceeds the existing threshold voltage level whereupon antenna switching to ANT-1 takes place at such time. It will be seen, then, that with the present system a weak, but undisturbed received, signal may be selected in favor of a stronger, but disturbed, signal.

Since frequency selective fading is program dependent, the present system, by measuring disturbance will function to switch antennas on the basis of program content, unrelated to vehicle motion. For example, it has been found that the antennas will switch consistently with music passages in some cases, switching to a lesser disturbed antenna occuring with changes in program frequency content and amplitude conditions. This is most apparent when the vehicle is parked.

The present invention helps to bridge the gap between switched diversity and the potentially more effective selection diversity receiver systems without requiring the complications of two receivers (or two receiver front ends). As is well understood, with selection diversity, both antennas are continuously monitored, and the antenna with the better signal is selected moment-by-moment. With the present diversity system, even though only one antenna signal at any given moment is monitored, since only one receiver is employed, the great speed at which the present system operates in response to a signal disturbance provides for signal selection in a time so short as to replicate a selection diversity system.

Without limiting the invention, the following table lists component values for the illustrated embodiment which have been found to be particularly well suited for use in mobile FM broadcast receivers.

| Resistors | Ohms |
|---|---|
| 128, 136, 72 | 1K |
| 56, 64 | 15K |
| 58, 82 | 47K |
| 66 | 470 |
| 68, 84, 98, 104, 86, 92, 132 | 4.7K |
| 74 | 33 |
| 94 | 330K |
| 97 | 15 |
| 110, 112 | 120K |
| 124 | 470K |
| 106 | 82K |
| Capacitors | μfd |
| 54, 60 | 0.01 |
| 76 | 220. |
| 78, 96 | 0.1 |
| 108 | 0.000047 |
| 114 | 0.0001 |
| 122 | 0.0022 |
| 138 | 6.8 |
| Diodes | Type |
| 70 | 5.4 v Zener |
| 116, 118, 120, 126 | 1N4148 |
| OP-AMPS | |
| 50, 90 | CA3240 (Dual Op-Amp) |
| FLIP-FLOPS | |
| 102, 140 | CA4013B (dual unit) |
| Transistor | |
| 130 | 2N3904 |

The invention having been described in detail in accordance with requirements of the Patent Statutes, various changes and modifications will suggest themselves to those skilled in this art.

Obviously, numerous different ways of momentarily preventing antenna switching operation when the fade control signal initially exceeds the threshold voltage and upon occurrence of a switching operation will be apparent to one skilled in this art. Also, it will be apparent that switching between more than two antennas is possible. Furthermore, operation with a single fade control signal obtained from a "meter" driver circuit is contemplated, without the need for an input from the "mute" control driver. Additionally, as noted above, an independent sensing circuit may be employed in the present system for use in producing a fade control signal input for the decision and control unit which reflects disturbances in the received signal over a wide frequency and amplitude range. It is intended that the above and other such changes and modifications shall fall within the spirit and scope of the present invention as defined in the appended claims.

I claim:

1. In an FM diversity receiver system having at least two antennas, antenna switching means for switching the receiver system from one antenna to the other, sensing means for producing a fade control signal related to the amplitude of the received FM signal, multipath disturbances in the received signal such as frequency selective fading and non-multipath disturbances such as received electrical noise impulses, including ignition noise signals, being manifested in said fade control signal, decision and control means responsive to the fade control signal from said sensing means for producing an antenna switching signal for control of said switching means, the improvement wherein said decision and control means comprises, means for establishing a threshold voltage, and means for comparing the threshold voltage to the magnitude of disturbances manifested in the fade control signal and for momentarily disabling antenna switching operation for a time period when the disturbances manifested in the fade control signal initially exceeds the threshold voltage to prevent antenna switching in response to short duration disturbances produced by electrical noise impulses, including ignition noise signals.

2. In an FM diversity receiver system as defined in claim 1 wherein said decision and control means includes, means for producing an antenna switching signal following the momentary disabling period whenever the disturbance manifested in the fade control signal, immediately following said momentary disabling period exceeds the threshold voltage level, no antenna switching signal being produced when the manifested disturbance is below the threshold voltage at the end of the momentary disabling period.

3. In an FM diversity receiver system as defined in claim 1 wherein said decision and control means includes, means for again momentarily disabling antenna switching operation for a short time period following an antenna switching operation to prevent antenna switching in response to switching transients produced during said antenna switching operation.

4. In an FM diversity receiver system as defined in claim 1 wherein said decision and control means includes, means for resetting the threshold voltage level, immediately prior to an antenna switching operation, to a level related to the magnitude of the disturbance manifested in the fade control signal immediately prior to an antenna switching operation whereby the fade control signal produced by the sensing means immediately after switching from one to another of said antennas is compared with the reset threshold voltage level established immediately prior to switching from said one antenna, the threshold voltage decreasing to a lower level over a period of time after operation of said resetting means.

5. In an FM diversity receiver system as defined in claim 4 wherein said decision and control means includes, means for momentarily disabling antenna switching operation for a short time period upon occurrence of an antenna switching operation to prevent antenna switching in response to switching transients produced during said antenna switching operation.

6. In an FM diversity receiver system as defined in claim 5 wherein said means for momentarily disabling antenna switching operation for a short time period when the magnitude of the disturbance manifested in the fade control signal initially exceeds the threshold voltage and said means for momentarily disabling antenna switching operation upon occurrence of an antenna switching operation momentarily disable antenna switching operation for a time period at least equal to the duration of the pre-detection impulse response time of the receiver.

7. In an FM diversity receiver system as defined in claim 1 wherein said momentary disabling means disables antenna switching operation for a period at least equal to the duration of the pre-detection impulse response time of the receiver.

8. In an FM diversity receiver system as defined in claim 1 wherein said receiver system includes means for producing meter and mute control signals, said decision and control means including means for combining said meter and mute control signals to provide said fade control signal.

9. In an FM diversity receiver system as defined in claim 1 wherein said sensing means for producing a fade control signal comprises IF peak level detection and driver means.

10. In an FM diversity receiver system as defined in claim 1 wherein said means for momentarily disabling antenna switching operation for a time period comprises a monostable flip-flop which is triggered when the magnitude of the disturbance manifested in the fade control signal initially exceeds the threshold voltage.

11. In an FM diversity receiver system as defined in claim 1 including capacitor coupling means for capacitive coupling the fade control signal from said sensing means to said decision and control means.

12. In an FM diversity receiver system having at least two antennas, antenna switching means for switching the receiver system from one antenna to the other, sensing means for producing a fade control signal related to the received FM signal, multipath disturbances, including frequency selective fading, in the received signal and non-multipath disturbances such as received electrical noise impulses, including ignition noise signals, being manifested in said fade control signal, and decision and control means responsive to the fade control signal from said sensing means for producing an antenna switching signal for control of said switching means, the improvement wherein said decision and control means comprises, means for establishing a threshold voltage, means for comparing the threshold voltage, immediately prior to said antenna switching operation, to the disturbance level manifested in the fade control signal and for producing an antenna switching operation when the disturbance level exceeds the threshold voltage, means for resetting the threshold voltage to a level related to the disturbance level manifested in the fade control signal immediately prior to said antenna switching operation, the reset threshold voltage slowly returning toward the level provided by said means for establishing a threshold voltage, and means for momentarily disabling further antenna switching operation for a time period upon occurrence of an antenna switching operation without disturbing the reset threshold voltage to prevent antenna switching in response to switching transients produced during said antenna switching operation.

13. In an FM diversity receiver system as defined in claim 12 including capacitor coupling means for capacitive coupling the fade control signal from said sensing means to said decision and control means.

14. In an FM diversity receiver system as defined in claim 12 wherein said means for momentarily disabling further antenna switching operation comprises means for momentarily clamping the fade control signal at a level below the threshold voltage.

15. In an FM diversity receiver system having at least two antennas, antenna switching means for switching the receiver system from one antenna to the other, sensing means for producing a fade control signal related to the received FM signal, multipath disturbances, including frequency selective fading, in the received signal and non-multipath disturbances such as received electrical noise impulses, including ignition noise signals, being manifested in said fade control signal, and decision and control means responsive to the fade control signal from said sensing means for producing an antenna switching signal for control of said switching means, the improvement wherein said decision and control means comprises, means for establishing a threshold voltage, means for comparing the threshold voltage to the disturbance level manifested in the fade control signal and for producing an antenna switching operation when the disturbance level exceeds the threshold voltage, means for resetting the threshold voltage level, immediately prior to said antenna switching operation to a level established by the disturbance level manifested in the fade control signal immediately prior to said antenna switching operation whereby the fade control signal produced by said sensing means immediately following said antenna switching operation is compared to the reset threshold level established immediately prior to said antenna switching operation, the threshold voltage decreasing to a lower threshold level over a period of time following operation of said resetting means, and means for momentarily disabling further antenna switching operation for a time period upon occurrence of an antenna switching operation to prevent antenna switching in response to switching transients produced during said antenna switching operation.

16. In an FM diversity receiver system having at least two antennas, antenna switching means for switching the receiver system from one antenna to the other, sensing means for producing a fade control signal related to the received FM signal, multipath disturbances, including frequency selective fading, in the received signal and non-multipath disturbances such as received electrical noise impulses, including ignition noise signals, being manifested in said fade control signal, and decision and control means responsive to the fade control signal from said sensing means for producing an antenna switching signal for control of said switching means, the improvement wherein said decision and control means comprises, means for establishing a threshold voltage, means for comparing the threshold voltage to the disturbance level manifested in the fade control signal and for producing an antenna switching operation when the disturbance level exceeds the threshold voltage, means for momentarily disabling further antenna switching operation for a time period upon occurrence of an antenna switching operation to prevent antenna switching in response to switching transients produced during said antenna switching operation, said receiver system including means for producing meter and mute control signals, and said decision and control means including means for combining said meter and mute control signals to provide said fade control signal in the presence of a mute control signal from said receiver system.

17. In an FM diversity receiver system as defined in claim 12 wherein said sensing means for producing a fade control signal comprises IF peak level detector and driver means.

18. In an FM diversity receiver system having at least two antennas, antenna switching means for switching the receiver system from one antenna to the other, sensing means for producing a fade control signal related to the amplitude of the received FM signal, and decision and control means responsive to the fade control signal from said sensing means for producing an antenna switching signal for control of said switching means, the improvement wherein said decision and control means comprises, means for establishing a threshold voltage, means for comparing the threshold voltage to the fade control signal and for producing an antenna switching operation when the fade control signal exceeds the threshold voltage, and means for resetting the threshold voltage level, immediately prior to said antenna switching operation, to a level established by the fade control signal immediately prior to said antenna switching operation whereby the fade control signal produced by the sensing means immediately following the antenna switching operation is compared with the reset threshold level established immediately prior to said antenna switching operation, the threshold voltage decreasing to a lower level over a period of time following operation of said resetting means.

19. In an FM diversity receiver system as defined in claim 18 wherein said sensing means for producing a fade control signal comprises IF peak level detector and driver means for production of a fade control signal in which multipath disturbances such as frequency selective fading and non-multipath disturbances such as received electrical noise impulses are manifested.

20. In an FM diversity receiver system having at least two antennas and antenna switching means for switching the receiver system from one antenna to another, the method comprising, in response to a received signal, generating a fade control signal which is related to the received signal and in which both multipath disturbances, such as frequency selective fading disturbances, and non-multipath disturbances, such as electrical noise impulses and switching transients produced during antenna switching operation, are manifested, comparing the magnitude of disturbances manifested in the fade control signal with a threshold voltage and producing an antenna switching operation when the manifested disturbance magnitude exceeds the threshold voltage, and momentarily preventing switching from one antenna to another when the manifested disturbance magnitude initially exceeds the threshold voltage to prevent antenna switching is response to electrical noise impulses which terminate while antenna switching is momentarily prevented.

21. In the method as defined in claim 20 wherein switching from one antenna to another is momentarily prevented for a period at least equal to the pre-detection impulse response time of the receiver when the manifested disturbance magnitude initially exceeds the threshold voltage.

22. In the method as defined in claim 20 including,
momentarily preventing switching from one antenna to another upon occurrence of an antenna switching operation to prevent antenna switching in response to switching transients produced during said antenna switching operation.

23. In the method as defined in claim 22 wherein switching from one antenna to another is momentarily prevented for a period of time at least equal to the pre-detection impulse response time of the receiver when the magnitude of the disturce manifested in the fade control signal initially exceeds the threshold voltage and when switching from one antenna to another does occur.

24. In the method as defined in claim 20 including,
immediately prior to an antenna switching operation, resetting the threshold voltage level to a level related to the magnitude of the manifested disturbance present at that time, the fade control signal produced immediately after antenna switching being compared with the reset threshold voltage level.

25. In an FM diversity receiver system having at least two antennas and means for switching the receiver system from one antenna to another, the method comprising,
in response to a received signal, generating a fade control signal which is related to the received signal and in which fade control signal both multipath and non-multipath disturbances are manifested, including frequency selective fading, electrical noise impulses and switching transients produced during antenna switching operation,
comparing the fade control signal with a threshold voltage and momentarily disabling antenna switching operation when the level of disturbances manifested in the fade control signal exceeds the threshold voltage,
if the level of disturbances manifested in the fade control signal exceeds the threshold voltage level immediately after said momentary disablement of antenna switching operation, then resetting the threshold voltage to a level related to the level of disturbances manifested in the fade control signal, otherwise continuing operation without resetting the reference threshold voltage, said threshold voltage slowly returning to a nominal level after resetting thereof, and
producing an antenna switching operation after resetting of the threshold voltage.

26. In a method as defined in claim 25 wherein antenna switching operation is disabled for a period of time at least equal to the duration of the pre-detection impulse response time of the receiver upon occurrence of said antenna switching operation.

27. In an FM diversity receiver system for processing transmitted FM signals comprising an FM receiver and at least two antennas,
antenna switching means for switching the receiver from one antenna to the other,
means for generating a fade control signal in response to disturbances in the FM receiver signal which fade control signal manifests both multipath and non-multipath disturbances in the receiver signal, and
decision and control means responsive to the output from the fade control signal generating means for controlling said antenna switching means, said decision and control means including time gating means responsive to fade control signals for gating out manifested disturbances of short time duration from the fade control signal to prevent operation of said antenna switching means in response to disturbances of short duration, such as electrical noise impulses produced by ignition noise, manifested in said fade control signal.

28. In an FM diversity receiver system as defined in claim 27 wherein the time gating means is operable for a time period at least substantially equal to the impulse response period of said receiver.

29. In a method as defined in claim 25 wherein said step of momentarily disabling antenna switching operation includes clamping the fade control signal at a level which does not exceed the threshold voltage.

30. In a method as defined in claim 25 including, upon occurrence of an antenna switching operation, momentarily disabling further antenna switching operation to prevent antenna switching in response to switching transients produced during said antenna switching operation.

31. In a method for switching between a plurality of antennas to select an antenna that has a satisfactory signal thereon, the steps of
sensing the received signal while the received signal has amplitude fluctuations as a result of multipath disturbances to obtain a fade control signal in which said amplitude fluctuations are manifested,
establishing a threshold voltage,
comparing the threshold voltage to the magnitude of disturbances manifested in the fade control signal,
when the magnitude of disturbances manifested in the fade control signal exceeds the threshold voltage for a time period, then momentarily resetting the level of the threshold voltage to a value related to the magnitude of the disturbance manifested in the fade control signal, and
switching to another antenna following said momentary resetting of the threshold voltage level.

32. In a method as defined in claim 31 including simultaneously momentarily disabling antenna switching operation and preventing resetting of the level of the threshold voltage for a time period when the disturbance manifested in the fade control signal initially exceeds the threshold voltage to prevent antenna switching and resetting of the threshold voltage, respectively, in response to short duration disturbances produced by electrical noise impulses, including ignition noise signals, the step of momentarily resetting the level of the threshold voltage occurring following the momentary disabling period when the disturbance manifested in the fade control signal immediately following the momentary disabling period exceeds the threshold voltage.

33. In a diversity receiver system having at least two antennas,
antenna switching means for switching the receiver system from one antenna to the other,
sensing means for producing a fade control signal related to the amplitude of the received signal, multipath disturbances in the received signal being manifested in said control signal, means for establishing a first threshold voltage level, means responsive to the fade control signal and threshold voltage for rapidly resetting the first threshold voltage level to a level related to the fade control signal when the fade control signal exceeds the threshold voltage level, the reset threshold voltage remaining only momentarily at said reset level and then decaying slowly toward the first level provided by said means for establishing a first threshold voltage level, and means for activating said switching means after resetting of the first threshold voltage level by said threshold voltage level resetting means.

34. In a diversity receiver system as defined in claim 33 wherein said means for resetting the threshold voltage level comprises peak detector means which operates prior to operation of said antenna switching means for resetting the first threshold voltage level when the level of the fade control signal exceeds the first threshold voltage level.

35. In a diversity receiver system as defined in claim 33 wherein non-multipath disturbances such as received electrical noise impulses also are manifested in said fade control signal, said system including, means for momentarily inhibiting operation of said means for rapidly resetting the threshold voltage level when the level of the fade control signal initially exceeds the first threshold voltage level to prevent resetting of the first threshold voltage and subsequent antenna switching operation in response to short duration disturbances produced by electrical noise impulses including ignition noise signals.

36. In a diversity receiver system having at least two antennas, antenna switching means for switching the receiver system from one antenna to another, sensing means for producing a fade control signal related to the amplitude of the received signal, multipath and non-multipath disturbances such as received electrical noise impulses including ignition noise signals being manifested in said fade control signal, means for establishing a threshold voltage, means responsive to the fade control signal and threshold voltage for momentarily disabling operation of said antenna switching means when the level of disturbances manifested in the fade control signal initially exceeds the threshold voltage, means operable after operation of said momentary disabling means for resetting the threshold voltage to an increased level related to the magnitude of the disturbances manifested in the fade control signal if the level of such disturbances immediately after operation of said momentary disabling means exceeds the threshold voltage level, said threshold voltage slowly returning toward a level established by said means for establishing a threshold voltage after resetting thereof, and means for actuating said antenna switching means immediately after resetting of the threshold voltage by said threshold voltage resetting means.

37. In a diversity receiver system having at least two antennas, antenna switching means for switching the receiver from one antenna to the other, means for producing meter and mute control signals, means for combining said meter and mute control signals to provide a fade control signal, means for establishing a threshold voltage, and means responsive to the threshold voltage and fade control signal for actuating the antenna switching means.

* * * * *